US010263858B2

United States Patent
Vijayanathan et al.

(10) Patent No.: US 10,263,858 B2
(45) Date of Patent: Apr. 16, 2019

(54) ENVIRONMENT SIMULATOR FOR USER PERCENTILE

(71) Applicant: Microsoft Technology Licensing, LLC, Redmond, WA (US)

(72) Inventors: Prasanna Vijayanathan, Sunnyvale, CA (US); Anant Rao, Fremont, CA (US); Sreedhar Veeravalli, Santa Clara, CA (US); Mark E. Pascual, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/426,840

(22) Filed: Feb. 7, 2017

(65) Prior Publication Data

US 2018/0227211 A1  Aug. 9, 2018

(51) Int. Cl.
| | |
|---|---|
| *H04L 12/26* | (2006.01) |
| *H04L 29/12* | (2006.01) |
| *H04L 29/08* | (2006.01) |
| *H04L 12/24* | (2006.01) |
| *G06F 11/32* | (2006.01) |
| *G06Q 30/02* | (2012.01) |
| *G06Q 50/00* | (2012.01) |
| *G06F 15/16* | (2006.01) |
| *G06F 12/00* | (2006.01) |
| *G06F 12/08* | (2016.01) |

(52) U.S. Cl.
CPC .......... *H04L 41/5038* (2013.01); *G06F 11/32* (2013.01); *G06Q 30/0201* (2013.01); *G06Q 50/01* (2013.01); *H04L 41/145* (2013.01); *H04L 67/02* (2013.01)

(58) Field of Classification Search
USPC .......................................... 709/224, 203, 220
See application file for complete search history.

(56) References Cited

U.S. PATENT DOCUMENTS

| | | | |
|---|---|---|---|
| 6,266,750 B1 * | 7/2001 | DeMone | G06F 13/4243 |
| | | | 711/169 |
| 9,923,793 B1 * | 3/2018 | Gore | H04L 43/0876 |
| 2010/0046377 A1 * | 2/2010 | Ryan | H04L 41/0681 |
| | | | 370/241 |

(Continued)

*Primary Examiner* — Jude Jean Gilles
(74) *Attorney, Agent, or Firm* — Schwegman Lundberg & Woessner, P.A.

(57) ABSTRACT

A system and method for generating a simulation environment are provided. In example aspects, in response to a request from a user of an environment simulation system, specifying a desired web performance metric to result from the execution of a particular content item, the environment simulation system constructs a simulation environment. The environment simulation system is configured to test the particular content item within the constructed simulation environment and compare a baseline web performance metric to the requested web performance metric. In some aspects, if the requested web performance metric is not achieved, the environmental simulation system is configured to perform tuning and continue simulating until the requested web performance metric is achieved. Once tuning is complete, a user can modify a content item and continue simulating to observe improvements in web performance of a content item for a user in a particular geographic region.

14 Claims, 5 Drawing Sheets

(56) References Cited

U.S. PATENT DOCUMENTS

| | | | |
|---|---|---|---|
| 2011/0220320 A1* | 9/2011 | Kidwell | F24T 10/17 |
| | | | 165/45 |
| 2013/0091578 A1* | 4/2013 | Bisht | G06F 21/53 |
| | | | 726/25 |
| 2013/0339574 A1* | 12/2013 | Franceschini | G06F 12/0246 |
| | | | 711/103 |
| 2014/0136668 A1* | 5/2014 | Brunswig | G06F 9/5072 |
| | | | 709/222 |
| 2015/0347705 A1* | 12/2015 | Simon | G06F 19/3431 |
| | | | 705/3 |
| 2017/0371761 A1* | 12/2017 | Piga | G06F 9/45516 |
| 2018/0046581 A1* | 2/2018 | Banerjee | G06F 12/1009 |
| 2018/0227211 A1* | 8/2018 | Vijayanathan | H04L 43/50 |
| 2018/0365167 A1* | 12/2018 | Eckert | G06F 12/1036 |

* cited by examiner

ENVIRONMENT SIMULATOR FOR USER PERCENTILE

TECHNICAL FIELD

Aspects of the present disclosure relate generally to web performance and, more particularly, but not by way of limitation, to generating a simulation environment.

BACKGROUND

The quality of user experience, with respect to a user's interaction with a webpage, depends in large part on the speed in which the webpage is downloaded and displayed on the user's web browser. These considerations are a part of web performance. Improvements in web performance not only increases the quality of user experience, but can also improve a computer's efficiency by decreasing the amount of data that is required to be transmitted across a network in order to produce a webpage, thereby reducing power consumption. User experience is often measured across many different geographies.

One particular metric used in measuring user experience across these geographies is a percentile. A percentile can indicate a data point from which a portion of measured data falls above or below a specified threshold value. For example, a percentile may represent a measurement of latency associated with a website. In terms of user experience, data points at or above a specified percentile (e.g., $90^{th}$ percentile) may represent certain user experiences having latency values higher than a specified latency threshold value (e.g., certain user experiences that fall below a latency standard).

For example, user experiences having latency values at or above a specified percentile may indicate users in certain geographic locations having poor user experiences of a particular website due to problems arising from several factors, including the user's network and CPU capabilities, I/O resources and web architecture. Furthermore, when a developer finds a solution to a performance issue for that user, that solution needs to be tested to validate the solution with respect to the performance issue. However, in many instances, the developer works within an environment that provides fast network speeds and quality equipment. The developer may not be able to test the solution and accurately simulate that solution in an environment similar to the actual user environment in terms of network speed and device performance.

BRIEF DESCRIPTION OF THE DRAWINGS

Various ones of the appended drawings illustrate example aspects of the present disclosure and cannot be considered as limiting its scope.

DETAILED DESCRIPTION

The description that follows includes systems, methods, techniques, instruction sequences, and computing machine program products that embody illustrative aspects of the disclosure. In the following description, for the purposes of explanation, numerous specific details are set forth in order to provide an understanding of various aspects of the inventive subject matter. It will be evident, however, to those skilled in the art, that aspects of the inventive subject matter may be practiced without these specific details. In general, well-known instruction instances, protocols, structures, and techniques are not necessarily shown in detail.

Difficulties in improving web performance may arise when a solution to a web performance challenge cannot be tested in an actual user environment. For example, a developer may not be able to accurately test a modification to a content item (e.g., html page), in order to observe its improvement in web performance, when the developer works with network speeds and device performances that are superior to that of a user, to which the improvement is aimed.

An environment simulation system simulates a complete user experience for a certain geographic location, utilizing known data with respect to various conditions that exist in that geographic location. The environment simulation system includes a variety of conditions that are particular to the user, for example, the CPU and network capacity, web architectures and I/O resources of the user and how they each interact in forming a complete user experience. In various example aspects, systems and methods for generating a simulation environment are described. An environment simulation system is configured to simulate a complete user experience for a specific geographic location based on a combination of various network conditions that exist in that geographic location.

Figure 1:
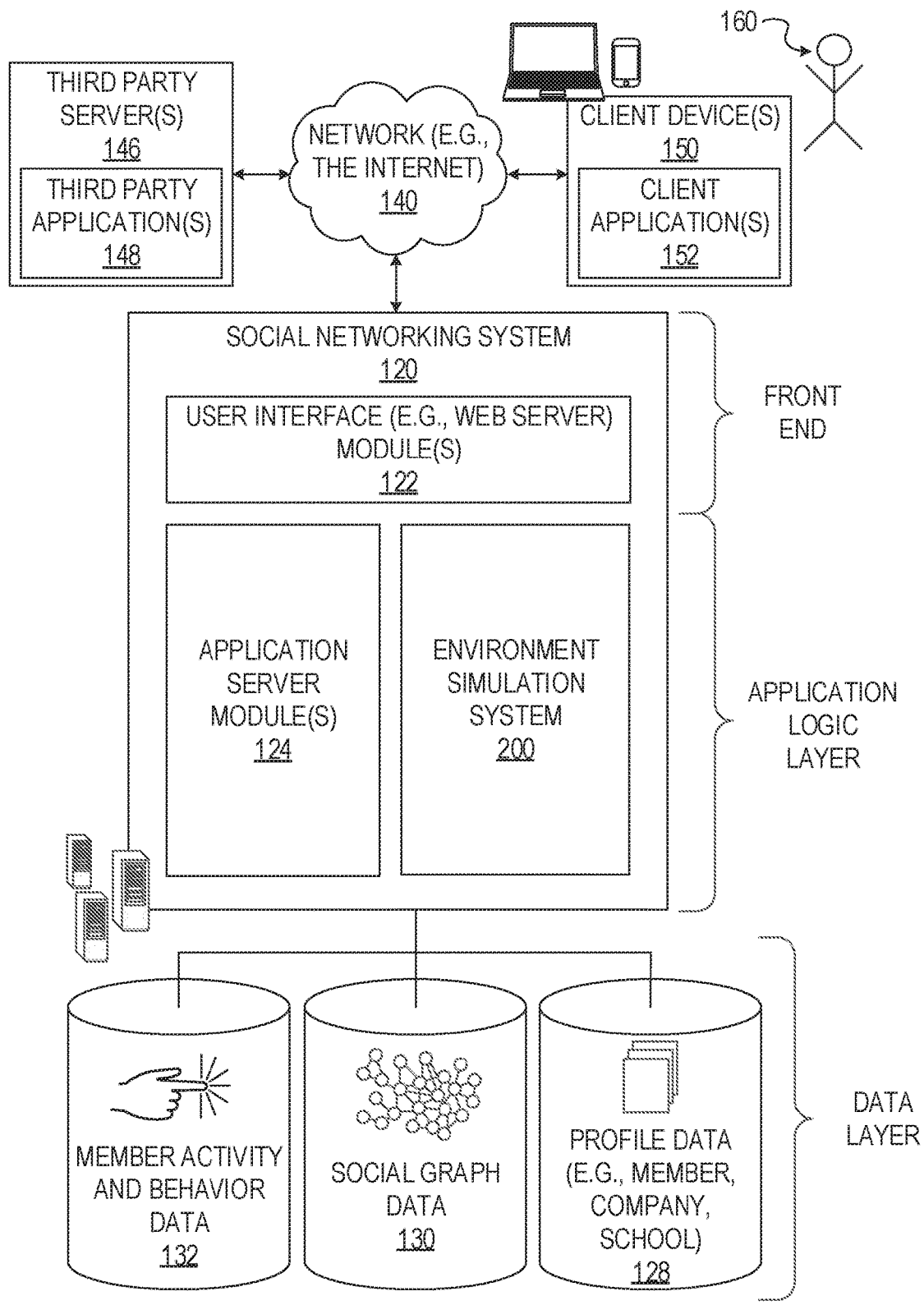
FIG. 1 is a network diagram depicting a client-server system within which various example aspects may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative aspects, any number of other entities might be included in the social graph, and as such, various other databases may be used to store data corresponding with other entities.

Consistent with some aspects, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some aspects, a member may elect to "follow" another member. In contrast to establishing a connection, the concept of "following" another member typically is a unilateral operation, and at least with some aspects, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some aspects, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

In some aspects, database 128 also stores and updates experimental data. For example, experimental data can include measured values with respect to user experience based on various user components and/or network components. Measured values can include, for example, measurements with respect to page latency (e.g., DOM load, DOM complete) according to efficiencies of particular network components (e.g., network delay, CPU limit, and efficiencies of I/O components and web architectures). In some aspects, experimental data is stored and updated in a network component table within database 128 and is accessed by the environment simulation system 200.

The social networking system 120 may provide a broad range of other applications and services that allow members the opportunity to share and receive information, often customized to the interests of the member. For example, with some aspects, the social networking system 120 may include a photo sharing application that allows members to upload and share photos with other members. With some aspects, members of the social networking system 120 may be able to self-organize into groups, or interest groups, organized around a subject matter or topic of interest. With some aspects, members may subscribe to or join groups affiliated with one or more companies. For instance, with some aspects, members of the social network service may indicate an affiliation with a company at which they are employed, such that news and events pertaining to the company are automatically communicated to the members in their personalized activity or content streams. With some aspects, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some aspects, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include an environment simulation system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
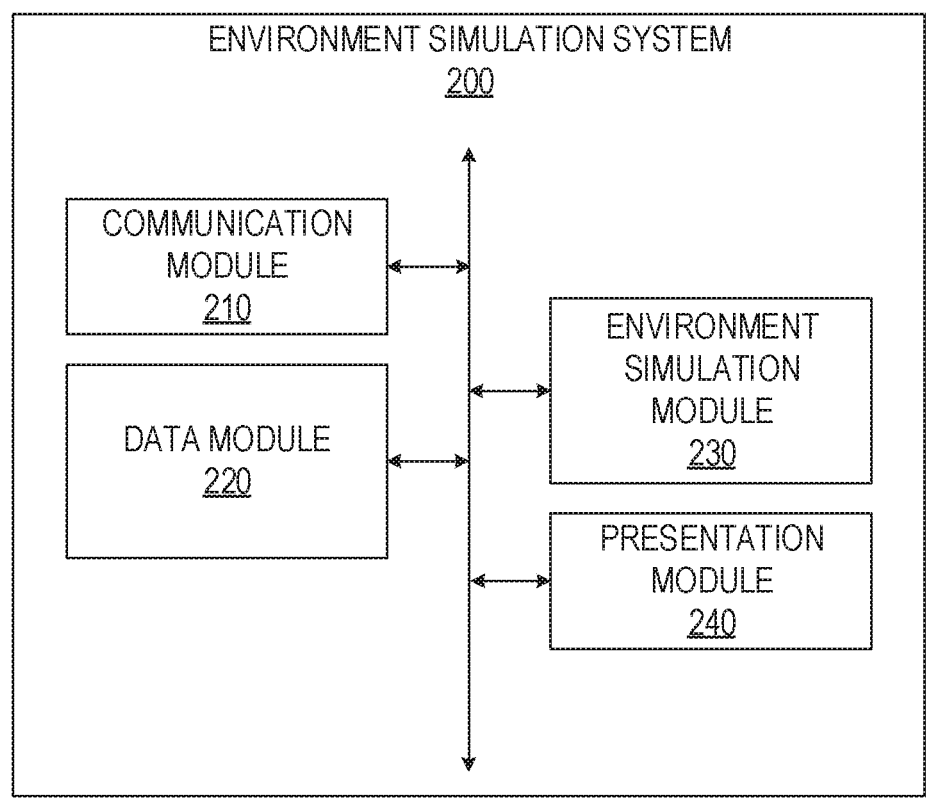
FIG. 2 is a block diagram illustrating components provided within the environment simulation system for simulating a user environment, according to some example aspects.

FIG. 2 is a block diagram illustrating components provided within the environment simulation system 200 for simulating a user environment, according to some example aspects. In some aspects, the environment simulation system 200 includes a communication module 210, a data module 220, an environmental simulation module 230 and a presentation module 240. The environment simulation system 200 simulates a complete user experience for a specific geographic location based on a combination of various network conditions that exist in that geographic location. The environment simulation system 200 receives a request including a particular web performance metric, such as a particular page latency value, and constructs a simulation environment. After the simulation environment is constructed the environment simulation system 200 can be utilized to execute a content item, such as an HTML page, within the constructed environment and observe how particular modifications to the content item affect the web performance of the content item for a user in a specific geographic location, having certain network conditions.

All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example aspects may also be included, but are not shown.

The communication module 210 is configured to perform various communication functions to facilitate the functionality described herein. For example, the communication module 210 may communicate with the social networking system 120 via the network 140 using a wired or wireless connection. The communication module 220 may also provide various web services functions such as retrieving information from the third party servers 146 and the social networking system 120. In this way, the communication module 210 facilitates the communication between the modification system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as accessing, exchanging, and storing information with databases or servers. For example, data module 220 may store and access experimental data including measured values with respect to user experience based on various components. Measured values include, for example, certain web performance metrics (e.g., page latency, time to first byte, DOM complete) according to the performance characteristics of particular network components (e.g., network delay, CPU limit, and performance characteristics of I/O components and web architectures). In some aspects, measured values include page latency, time to first byte and DOM complete time, according to network delay, CPU limit, and performance characteristics of I/O components and web architectures. In some aspects, the data module 220 exchanges information with third party servers 146, client devices 150, and other sources of information.

The environment simulation module 230 is configured to simulate a complete user experience for a specific geographic location based on a combination of various network conditions that exist in that geographic location. In some aspects, the environment simulation module 230 performs environment simulation by constructing the simulation environment and executing a content item within the constructed environment. The constructed simulation environment can include, for example, a combination of network component performance values, representing a configuration of an actual network, that yield a desired web performance metric (e.g., page latency, DOM ready time, DOM complete time) when executing a particular content item. The content item can include, for example, an HTML page or any browser-enabled object.

In some aspects, in response to a request from a user of the environment simulation system 200, specifying a desired web performance metric to result from the execution of a particular content item, the environment simulation module 230 constructs a simulation environment. The environment simulation module 230 is configured to test the particular content item within the constructed simulation environment, following the construction of the simulation environment. In some aspects, the environment simulation module 230 receives a request from a user (e.g., developer) specifying a desired page latency to result from the execution of a particular HTML test page. Based on the received request specifying the desired page latency, the environment simulation module 230 constructs a simulation environment that will yield the desired page latency when executing the HTML test page, as fully described in detail below.

In some aspects, the environment simulation module 230 is configured to access experimental data from a database (e.g., database 128) after receiving a request specifying a desired page latency. In some aspects, experimental data includes network component performance values, for example, combinations of various CPU limit values and network delay values. The environment simulation module 230 may be configured to initiate a simulation of a content item using the network component performance values to obtain a baseline web performance metric. For example, the environment simulation module 230 may be configured to initiate a simulation of an HTML test page, using one of a combination of CPU limit and network delay values, to obtain a baseline page latency value.

The environmental simulation module 230 may be configured to compare the baseline web performance metric to the requested web performance metric, and if the requested web performance metric is not achieved, the environmental simulation module 230 may tune the network component performance values and continue simulating until the resulting baseline web performance metric is within an acceptable threshold of the requested web performance metric. For example, the environmental simulation module 230 may be configured to compare the baseline page latency value to the requested page latency value, and if the requested page latency value is not achieved, the environmental simulation module 230 tunes the combination of CPU limit values and network delay values and continues simulating until the resulting baseline page latency value is within an acceptable threshold of the requested page latency value. In some aspects, the environmental simulation module 230 may be configured to tune by calculating variances and modifying the CPU limit values and the network delay values by the calculated variances, as fully described in detail below.

In some aspects, once the environmental simulation module 230 obtains a resulting web performance metric that is within an acceptable threshold of the requested web performance metric, the construction of the simulation environment is complete. The constructed simulation environment then includes the network component performance values that yield the requested web performance metric. For example, once the environmental simulation module 230 obtains a sufficient page latency value result, the construction of the simulation environment is complete and includes the CPU limit and network delay values that yield the requested page latency value.

In some aspects, the environmental simulation module 230 performs a fixed number of tuning iterations on the network component performance values. Alternatively, the environmental simulation module 230 may continue performing tuning iterations until the difference between the requested web performance metric and the resulting web performance metric are within a fixed threshold value, for example, a resulting page latency value within 100 ms of a requested page latency value.

In some aspects, once the simulation environment is complete, a user can then simulate a content item in the constructed simulation environment, modify the content item and continue simulating the content item to observe continued results of the simulation of the content item within the simulation environment. For example, a developer can simulate an HTML page in the constructed simulation environment, make changes to the HTML page and continue simulating the HTML page to observe any improvements to the web performance of the HTML page within the simulation environment. In this way, for example, the developer can observe specific improvements to a webpage experienced by a user in a distant geographic region, having a network configuration unique from that of the developer and similar to the constructed simulation environment.

In some aspects, the environment simulation module 230 is configured to perform tuning by calculating variance values and applying these values to the network component performance values. For example, the environment simulation module 230 performs tuning by calculating CPU limit variances and network delay variances and applying these values to the CPU limit and network delay values obtained from the database. In some aspects, the environment simulation module 230 modifies network component performance values by adding or subtracting a calculated CPU limit variance from the CPU limit value obtained from the database 128 and adding or subtracting a calculated network delay variance from the network delay value obtained from the database 128.

Following the modification of the network component performance values, the environment simulation module 230 simulates the modified CPU limit and network delay values. In some aspects, the environment simulation module 230 repeats the tuning, modification and simulation of the network component performance values until the difference between the requested web performance metric and the resulting web performance metric are within an acceptable threshold value. For example, the environment simulation module 230 continues tuning, modifying and simulating the CPU limit and network delay values and repeats these steps until the difference between the requested page latency value and the resulting page latency value are within an acceptable threshold value.

In some aspects, the environment simulation module 230 calculates the variance values from the experimental tuning function $f(x)+g(y)$. In some aspects, the experimental data stored in database 128 includes web performance metrics that fluctuate close to linearly with respect to a particular network component performance value. For example, certain experimental data can include DOM ready time values that exhibit a fluctuation of 1000-1300 ms with a 100 ms increase network delay. In other aspects, the experimental data stored in database 128 includes web performance metrics that fluctuate exponentially with respect to a particular network component performance value. For example, certain experimental data can include DOM ready time values that fluctuate in a decaying exponential fashion relative to an increase in CPU load percentage.

In some aspects, the environment simulation module 230 calculates variance values according to the tuning function $f(x)+g(y)$, where $f(x)$=network delay=$mx+b$, for a given constant CPU limit percentage with x being the variable network delay time, b being a y-intercepting value of a specific page latency time and m being a slope of m~28, and where $g(y)$=CPU limit=$ar^x$, for a given constant network delay time with x being the variable CPU limit percentage, y being a variable page latency time and r being the logarithmic scale of CPU limit equation. In other aspects of the tuning function $f(x)+g(y)$, $f(x)$=network delay=$mx+b$, with b being a y-intercepting value of a specific DOM ready time and $g(y)$=CPU limit=$ar^x$, with y being a variable DOM ready time.

In some aspects, after the environment simulation module 230 retrieves the network component performance values (e.g., one of the combinations of CPU limit and network delay values) from a database (e.g., database 128) and initiates a simulation of a content item (e.g., HTML test page), obtaining a baseline value for the web performance metric (e.g., page latency), the environment simulation module 230 begins the tuning process. In some aspects, the environment simulation module 230 tunes by first determining network delay variance, a value by which network delay is to be incremented or decremented.

In some aspects, the network delay variance, $\Delta$ network delay, is equal to network delay$_{target}$−network delay$_{actual}$, where network delay$_{target}$ is the network delay value obtained from the database 128, used in determining the baseline page latency value, and network delay$_{actual}$ is the network delay value corresponding to the actual baseline page latency value obtained after the first simulation, according to the network delay portion of the tuning function, $f(x)$=network delay=$mx+b$.

In some aspects, the difference between network delay$_{actual}$ and network delay$_{target}$ is the amount by which the environment simulation module 230 increments or decrements the network delay values in order to get closer to the requested page latency value. The environment simulation module 230 then applies the network delay variance, $\Delta$ network delay, and the baseline page latency values to the CPU limit portion of the tuning function, $g(y)$=CPU limit=ar$^x$, to determine the CPU limit variance, the amount of variance that should be applied to the CPU limit in order to get closer to the requested page latency value.

In some aspects, the environment simulation module 230 continues to perform iterations of simulating the HTML test page, comparing the resulting page latency of each individual simulation to the requested page latency, and utilizing the tuning functions to determine the CPU limit variances and network delay variances to apply to each individual simulation. In some aspects, the environment simulation module 230 performs a fixed number of iterations of simulation and tuning (e.g., 20 iterations of simulation and tuning). In other aspects, the environment simulation module 230 performs iterations of simulation and tuning for a specified period of time, completing as many iterations as possible within the specified period (e.g., simulating and tuning for 100 ms).

When the environment simulation module 230 completes simulation and tuning, the result is a constructed simulation environment. The constructed simulation environment is configured to simulate a complete user experience, unique from the network configuration of a user (e.g., developer). For example, the constructed simulation environment can be configured to mimic a network environment of a user in a distant geographic region, including the combination of network conditions that are particular to that user (e.g., CPU performance, network delay). The developer is able to modify a content item, such as an HTML page, and utilize the constructed simulation environment to test the modified HTML page in order to observe the results that the modifications would have on the performance of the HTML page in the distant geographic region of the user.

In some aspects, the presentation module 240 is configured to present a user interface that is configured to receive a simulation request including a particular web performance metric. For example, the user interface is configured to receive a simulation request including a particular page latency value. In some aspects, the presentation module 240 is configured to present simulation results from the environment simulation module 230 at a user interface. For example, the presentation module 240 can present results of the construction of the simulation environment (e.g., web performance metrics achieved from each iteration of simulation and tuning) and results of simulating a content item within a constructed simulation environment.

Figure 3:
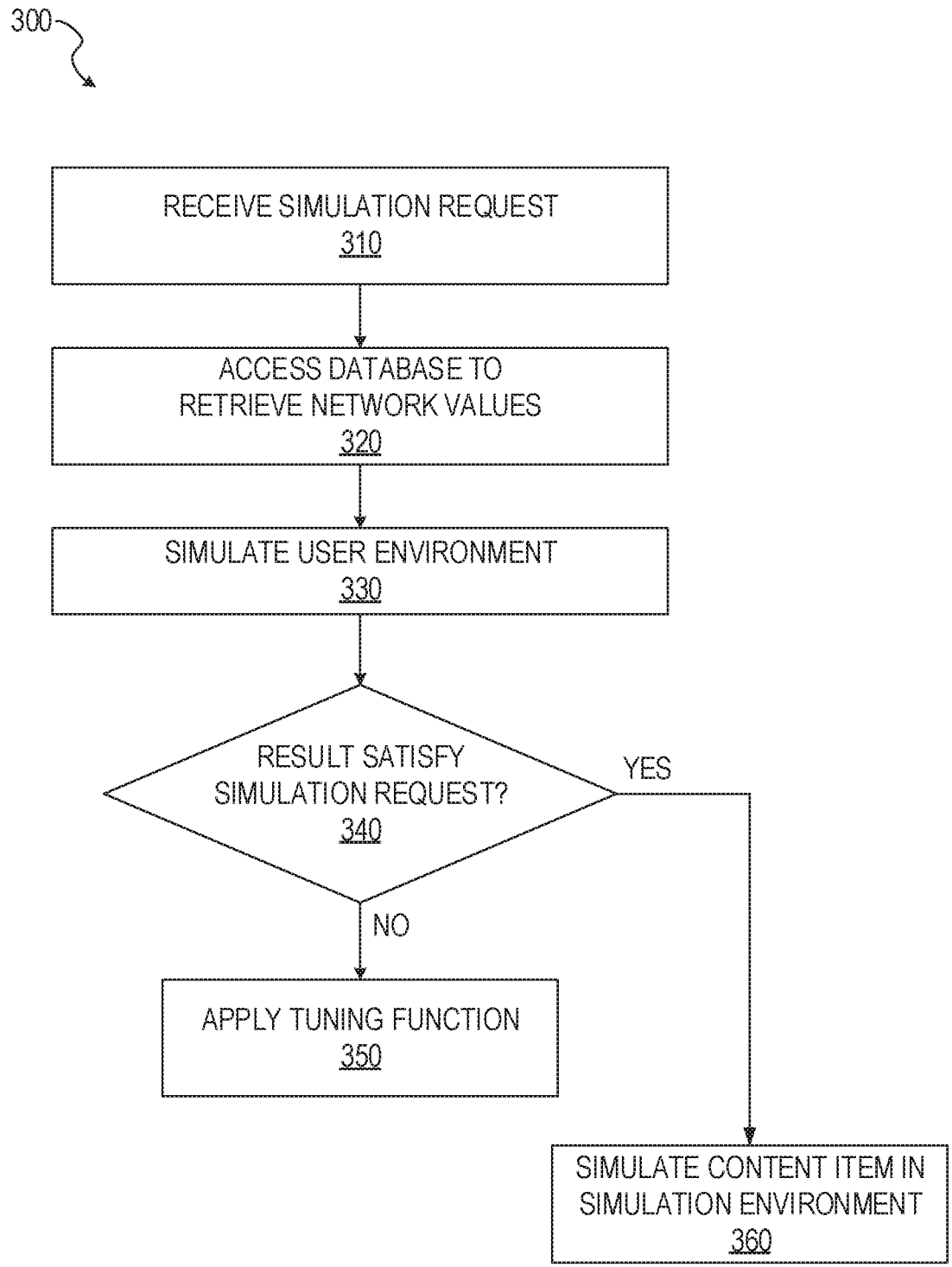
FIG. 3 is a flow diagram illustrating an example information flow for constructing a simulation environment, according to some example aspects.

FIG. 3 is a block diagram illustrating an example information flow, 300, for constructing a simulation environment including receiving a simulation request 310, accessing a database to retrieve network values 320, simulating a user environment 330, determining whether a result satisfies the simulation request 340, and applying a tuning function 350, or alternatively simulating a content item in the simulation environment 360. At 310, the environment simulation system 200 receives a simulation request specifying a particular web performance metric (e.g., page latency, DOM load, DOM complete). In response to receiving the simulation request, at 320 the environment simulation system 200 (e.g., the environment simulation module 230) accesses a database (e.g., database 128) to retrieve network values.

In one aspect, network values are experimental data stored in a network component table within database 128, and include a plurality of combinations of measured network component performance values with respect to various network components, for example, network component performance values as described with respect to FIG. 2. A single combination of the plurality of combinations of measured network component performance values, for example, is a combination of a CPU limit value with a network delay value that experimentally yields a particular page latency value, DOM complete time, or any other requested web performance metric. For example, a single combination of measured network component performance values correlate to a particular page latency value in accordance with the tuning function $f(x)+g(y)$.

In some aspects, after receiving a simulation request, the environment simulation module 230 retrieves, from the network component table within database 128, a single combination of network component performance values corresponding to a particular page latency value. Alternatively, the environment simulation module 230 is configured to retrieve a plurality of combinations of network component performance values that each correspond to a particular page latency value. In some aspects, the environment simulation module 230 is configured to allow a user to choose a single combination of network values or a plurality of combinations of network values for simulating.

In some aspects, at 330, the environment simulation module 230 simulates one of the combinations of network component performance values, or alternatively, a plurality of combinations of network component performance values, resulting in a baseline page latency value. In some aspects, a simulation result can alternatively be multiple baseline page latency values, for example, in the case of simulating a plurality of combinations.

At 340, the environment simulation module 230 compares the baseline page latency value resulting from the simulated combination of network component performance values to the requested page latency value included in the received simulation request. If the baseline page latency value is equal to the requested page latency value, in 360, the simulation environment is complete and the environment simulation module 230 does not tune the network component performance values. In some aspects, if a baseline page latency value differs from the requested page latency value, in 350, the environment simulation module 230 applies a tuning function and continues simulation to achieve the requested page latency value. For example, the environment simulation module 230 applies a tuning function $f(x)+g(y)$, as described with respect to FIG. 2.

The environment simulation module 230 may also apply the tuning function and continue simulating until the resulting baseline page latency value is within a specified threshold value of the requested page latency value, for example, the resulting baseline page latency value being within 100 ms of the requested page latency value. Alternatively, the environment simulation module 230 is configured to apply the tuning function and continue simulating for a fixed number of iterations, discontinuing the simulation and utilizing the baseline page latency value that results (e.g., performing 20 simulation iterations and utilizing the resulting page latency value).

Figure 4:
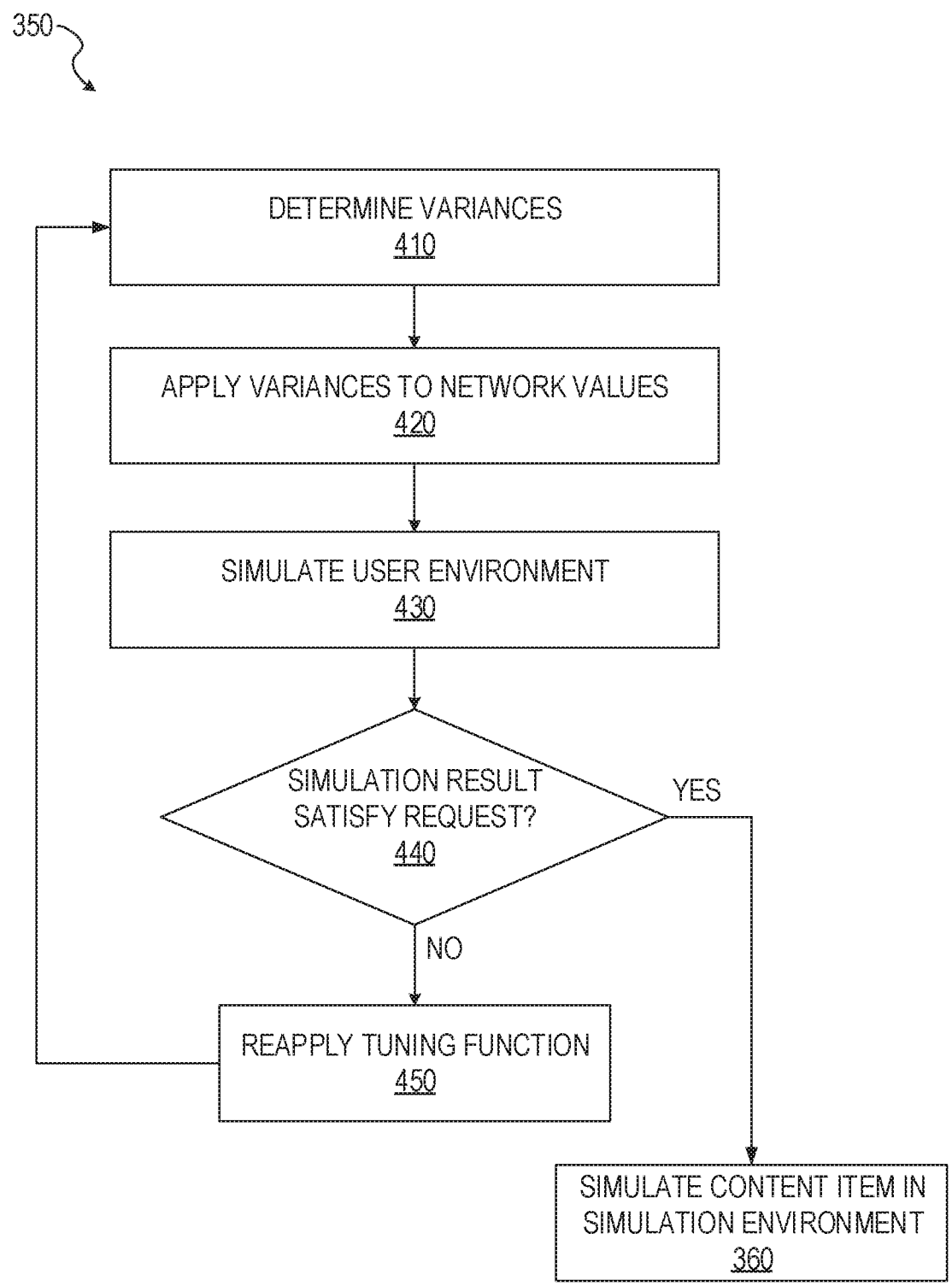
FIG. 4 is a block diagram illustrating an example information flow for tuning network component performance values, according to some example aspects.

FIG. 4 is a block diagram illustrating an example information flow, 350, for tuning network component performance values, including determining variances 410, applying variances to network values 420, simulating a user environment 430, determining whether a resulting web performance metric satisfies the requested web performance metric within the simulation request 440 and reapplying the tuning function 450, or alternatively simulating a content item in the simulation environment 360. In some aspects, at 410, the environment simulation module 230 determines variances for the network component performance values utilized in the simulation of 300 in FIG. 3 (e.g., the CPU limit value and network delay value). In determining the variances for the CPU limit value and the network delay value, the environment simulation module 230 utilizes the tuning function $f(x)+g(y)$, calculating the network delay portion of the tuning function $f(x)$ and the CPU limit portion of the tuning function, as described with respect to FIG. 2.

In some aspects, after determining a variance (e.g., network component variance) to apply to one or more of the network component performance values for tuning, in 420, the environment simulation module 230 modifies the network component performance values by applying the calculated variance to one or more of the network component performance values. For example, the environment simulation module 230 applies the calculated variances by adding or subtracting a CPU limit variance from the CPU limit value obtained from the database 128, and by adding or subtracting a calculated network delay variance from the network delay value obtained from the database 128.

In some aspects, following the modification of the network component performance values, at 430, the environment simulation module 230 simulates the modified CPU limit and network delay values that define the user environment. The result of the simulation is a web performance metric that can then be compared to the requested web performance metric in the simulation request. For example, the environment simulation module 230 compares the resulting page latency value, from the simulation, to the requested page latency value in the simulation request.

In some aspects, at 450, the environment simulation module 230 repeats the tuning, modification and simulation of the network component performance values until the difference between the requested web performance metric and the resulting web performance metric are within an acceptable threshold value. For example, the environment simulation module 230 is configured to repeat the steps of determining the CPU limit and network delay variances, applying variances to the network component performance values, and simulating the CPU limit and network delay values until the difference between the requested page latency value and the resulting page latency value are within an acceptable threshold value.

In some aspects, at 360, when the environment simulation module 230 achieves a resulting web performance metric that is within an acceptable threshold value of the requested web performance metric, the construction of the simulation environment is complete. The environment simulation module 230 is configured to utilize the constructed simulation environment that yield the requested web performance metric and simulate a content item. In some aspects, the constructed simulation environment includes the CPU limit and network delay values that yield a requested page latency value and mimics a network environment of a user in a distant geographic region, including the combination of network conditions that are particular to that user (e.g., CPU performance, network delay).

The constructed simulation environment is configured to simulate a content item in the same manner of the network environment of the user in the distant geographic region. In some aspects, a developer can utilize the constructed simulation environment to modify a content item, such as an HTML page, and test the modified HTML page in order to observe the results that certain modifications would have on the performance of the HTML page in the distant geographic region of the user.

Figure 5:
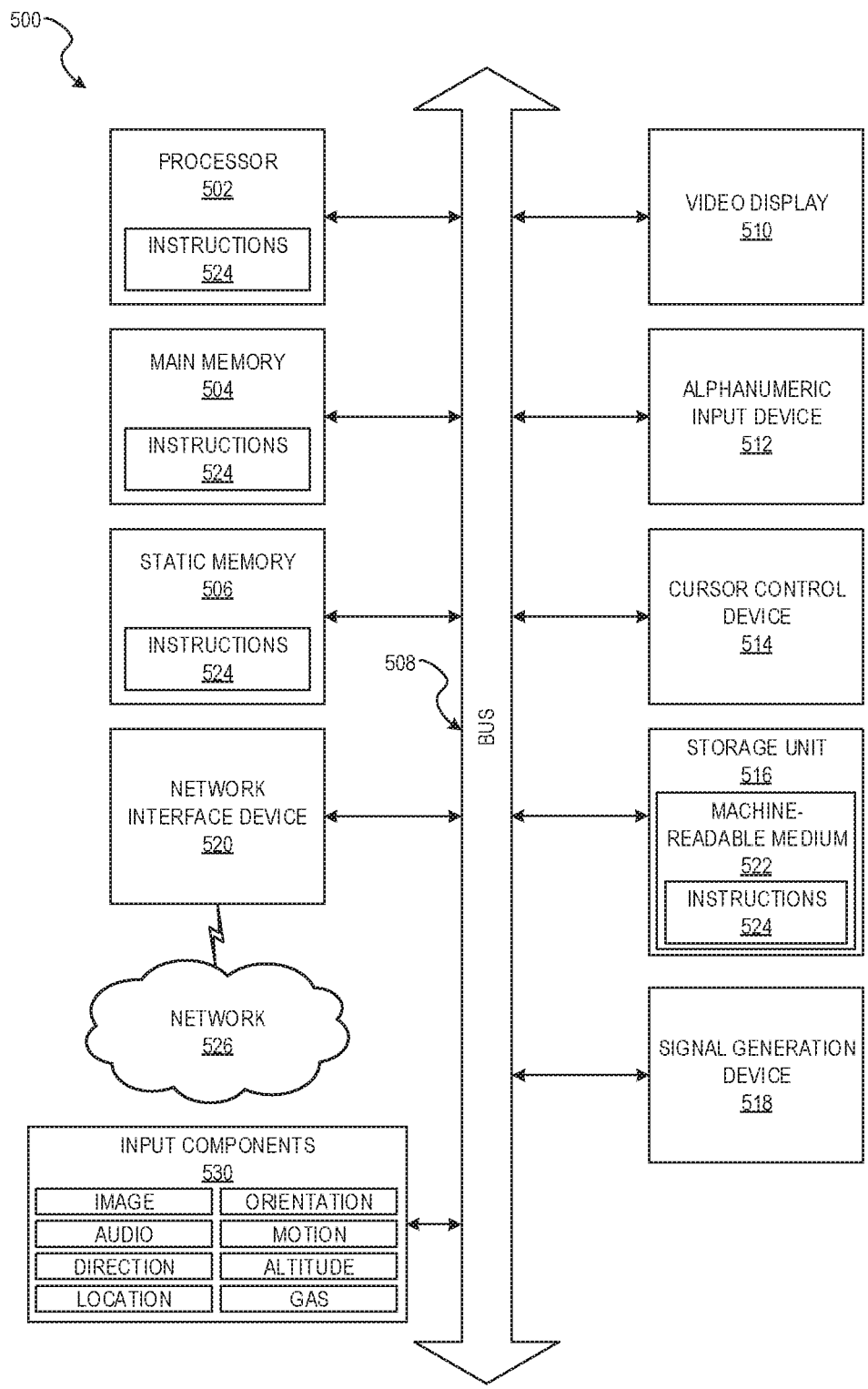
FIG. 5 illustrates a diagrammatic representation of a machine in the form of a computer system within which a set of instructions may be executed for causing the machine to perform any one or more of the methodologies discussed herein, according to an example aspect.

FIG. 5 is a block diagram illustrating components of a machine 500, according to some example aspects, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 524 (e.g., software, a program, an application, an applet, an app, or other executable code) for causing the machine 500 to perform any one or more of the methodologies, associated with the modification system 200, discussed herein may be executed. In alternative aspects, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Any of these machines can execute the operations associated with the modification system 200. Further, while only a single machine 500 is illustrated, the term "machine" shall also be taken to include a collection of machines 500 that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a video display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 embodying any one or more of the methodologies or functions described herein. The instructions 524 may also reside, completely or at least partially, within the main memory 504, within the static memory 506, within the processor 502 (e.g., within the processor's cache memory), or all three, during execution thereof by the machine 500. Accordingly, the main memory 504, static memory 506 and the processor 502 may be considered as machine-readable media 522. The instructions 524 may be transmitted or received over a network 526 via the network interface device 520.

In some example aspects, the machine 500 may be a portable computing device, such as a smart phone or tablet computer, and have one or more additional input components 530 (e.g., sensors or gauges). Examples of such input components 530 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, random-access memory (RAM), read-only memory (ROM), buffer memory, flash memory, and cache memory. While the machine-readable medium 522 is shown in an example aspect to be a single medium, the term "machine-readable medium" should be taken to include a single medium or multiple media (e.g., a centralized or distributed database, or associated caches and servers) able to store instructions 524. The term "machine-readable medium" shall also be taken to include any medium, or combination of multiple media, that is capable of storing instructions (e.g., instruction 524) for execution by a machine (e.g., machine 500), such that the instructions, when executed by one or more processors of the machine 500 (e.g., processor 502), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 522 is non-transitory in that it does not embody a propagating signal. However, labeling the machine-readable medium 522 as "non-transitory" should not be construed to mean that the medium is incapable of movement; the medium should be considered as being transportable from one physical location to another. Additionally, since the machine-readable medium 522 is tangible, the medium may be considered to be a machine-readable device.

The instructions 524 may further be transmitted or received over a communications network 526 using a transmission medium via the network interface device 520 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain aspects are described herein as including logic or a number of components, modules, or mechanisms. Modules may constitute either software modules (e.g., code embodied on a machine-readable medium 522 or in a transmission signal) or hardware modules. A "hardware module" is a tangible unit capable of performing certain operations and may be configured or arranged in a certain physical manner. In various example aspects, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some aspects, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering aspects in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 502, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In aspects in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions described herein. As used herein, "processor-implemented module" refers to a hardware module implemented using one or more processors 502.

Similarly, the methods described herein may be at least partially processor-implemented, with a processor 502 being an example of hardware. For example, at least some of the operations of a method may be performed by one or more processors 502 or processor-implemented modules. Moreover, the one or more processors 502 may also operate to support performance of the relevant operations in a "cloud computing" environment or as a "software as a service" (SaaS). For example, at least some of the operations may be performed by a group of computers (as examples of machines 500 including processors 502), with these operations being accessible via the network 526 (e.g., the Internet) and via one or more appropriate interfaces (e.g., an application program interface (API)).

The performance of certain of the operations may be distributed among the one or more processors 502, not only residing within a single machine 500, but deployed across a number of machines 500. In some example aspects, the one or more processors 502 or processor-implemented modules may be located in a single geographic location (e.g., within a home environment, an office environment, or a server farm). In other example aspects, the one or more processors 502 or processor-implemented modules may be distributed across a number of geographic locations.

Although an overview of the inventive subject matter has been described with reference to specific example aspects, various modifications and changes may be made to these aspects without departing from the broader scope of aspects of the present disclosure. Such aspects of the inventive subject matter may be referred to herein, individually or collectively, by the term "invention" merely for convenience and without intending to voluntarily limit the scope of this application to any single disclosure or inventive concept if more than one is, in fact, disclosed.

The aspects illustrated herein are described in sufficient detail to enable those skilled in the art to practice the teachings disclosed. Other aspects may be used and derived therefrom, such that structural and logical substitutions and changes may be made without departing from the scope of this disclosure. The Detailed Description, therefore, is not to be taken in a limiting sense, and the scope of various aspects is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various aspects of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of aspects of the present disclosure as represented by the appended claims. The specification and drawings are, accordingly, to be regarded in an illustrative rather than a restrictive sense.

What is claimed is:

1. A system comprising:
a processor, and a memory including instructions, which when executed by the processor, cause the processor to:
receive a simulation request, the simulation request including a requested page latency value for a web page and a requested geographic location;
retrieve, from a network component table in a database, a plurality of network component performance values corresponding to the requested geographic region;
generate a first page latency value for the web page by simulating serving the web page using the plurality of network component performance values in a simulation;
compare the first page latency value for the web page to the requested page latency value for the web page to determine whether the difference between the first page latency value for the web page and the requested page latency value for the web page is less than a predefined threshold; and
in response to determining that the difference between the first page latency value for the web page and the requested page latency value for the web page is not less than the predefined threshold value, fine tune the simulation by altering the plurality of network component performance values and repeating the simulating, comparing, and fine tuning until the page latency of the web page within the simulation is within the predefined threshold value of the requested page latency value for the web page.

2. The system of claim 1, wherein the plurality of network component performance values includes one or more combinations of network component performance values.

3. The system of claim 2, wherein the one or more combinations of network component performance values includes one or more combinations of a CPU limit value and a network delay value.

4. The system of claim 1, wherein the instructions further comprise:
in response to determining that the difference between the first page latency value for the web page and the requested page latency value for the web page is less than the predefined threshold value, present, at a user interface, the first page latency.

5. The system of claim 4, wherein the fine tuning comprises:
calculating a network component variance;
generating an additional network component performance value by applying the network component variance to the network component performance value.

6. The system of claim 5, wherein the applying the network component variance includes adding or subtracting the network component variance from the network component performance value.

7. A method comprising:

using one or more computer processors:

receiving a simulation request, the simulation request including a requested page latency value for a web page and a requested geographic location;

retrieving, from a network component table in a database, a plurality of network component performance values corresponding to the requested geographic region;

generating a first page latency value for the web page by simulating serving the web page using the plurality of network component performance values in a simulation;

comparing the first page latency value for the web page to the requested page latency value for the web page to determine whether the difference between the first page latency value for the web page and the requested page latency value for the web page is less than a predefined threshold;

in response to determining that the difference between the first page latency value for the web page and the requested page latency value for the web page is not less than the predefined threshold value, fine tuning the simulation by altering the plurality of network component performance values and repeating the simulating, comparing, and tine tuning until the page latency of the web page within the simulation is within the predefined threshold value of the requested page latency value for the web page.

8. The method of claim 7, wherein the plurality of network component performance values includes one or more combinations of network component performance values.

9. The method of claim 8, wherein the one or more combinations of network component performance values includes one or more combinations of a CPU limit value and a network delay value.

10. The method of claim 7, further comprising:

in response to determining that the difference between the first page latency value for the web page and the requested page latency value for the web page is less than the predefined threshold value, presenting, at a user interface, the first page latency.

11. The method of claim 10, wherein the wherein the fine tuning comprises:

calculating a network component variance;

generating an additional network component performance value by applying the network component variance to the network component performance value.

12. The method of claim 11, wherein the applying the network component variance includes adding or subtracting the network component variance from the network component performance value.

13. A machine-readable medium not having any transitory signals and storing instructions that, when executed by at least one processor of a machine, cause the machine to perform operations comprising:

using one or more computer processors:

receiving a simulation request, the simulation request including a requested page latency value for a web page and a requested geographic location;

retrieving , from a network component table in a database, a plurality of network component performance values corresponding to the requested geographic region;

generating a first page latency value for the web page by simulating serving the web page using the plurality of network component performance values in a simulation;

comparing the first page latency value for the web page to the requested page latency value for the web page to determine whether the difference between the first page latency value for the web page and the requested page latency value for the web page is less than a predefined threshold;

in response to determining that the difference between the first page latency value for the web page and the requested page latency value for the web page is not less than the predefined threshold value, fine tuning the simulation by altering the plurality of network component performance values and repeating the simulating, comparing, and fine tuning until the page latent of the web page within the simulation is within the predefined threshold value of the requested page latency value for the web page.

14. The machine-readable medium of claim 13, further comprising:

in response to determining that the difference between the first page latency value for the web page and the requested page latency value for the web page is less than the predefined threshold value, present, at a user interface, the first page latency.

* * * * *

UNITED STATES PATENT AND TRADEMARK OFFICE
CERTIFICATE OF CORRECTION

PATENT NO. : 10,263,858 B2  
APPLICATION NO. : 15/426840  
DATED : April 16, 2019  
INVENTOR(S) : Vijayanathan et al.

Page 1 of 1

It is certified that error appears in the above-identified patent and that said Letters Patent is hereby corrected as shown below:

In the Claims

In Column 17, Line 26, in Claim 7, delete "tine" and insert --fine-- therefor

In Column 17, Line 44, in Claim 11, delete "wherein the wherein the" and insert --wherein the-- therefor In Column 18, Line 16, in Claim 13, delete "retrieving ," and insert --retrieving,-- therefor In Column 18, Line 34, in Claim 13, delete "latent" and insert --latency-- therefor Signed and Sealed this  
Seventeenth Day of March, 2020

Andrei Iancu  
*Director of the United States Patent and Trademark Office*